United States Patent
Langkamp

[19]

[11] Patent Number: 6,000,431
[45] Date of Patent: Dec. 14, 1999

[54] SERVO VALVE

[75] Inventor: Bernd Langkamp, Stuttgart, Germany

[73] Assignee: DaimlerChrysler AG, Germany

[21] Appl. No.: 08/746,543

[22] Filed: Nov. 13, 1996

[30] Foreign Application Priority Data

Nov. 13, 1995 [DE] Germany .......................... 195 42 200

[51] Int. Cl.$^6$ .................................................. F15B 9/10
[52] U.S. Cl. .................... 137/625.23; 91/375 A; 137/625.24
[58] Field of Search .................. 137/625.23, 625.24; 91/375 A

[56] References Cited

U.S. PATENT DOCUMENTS

| 4,434,966 | 3/1984 | Zajac .............................. 137/625.69 X |
| 4,588,161 | 5/1986 | Adams ................................ 137/625.24 |
| 4,838,954 | 6/1989 | Perach ........................... 137/625.24 X |
| 4,924,910 | 5/1990 | Tabata et al. . | |
| 5,016,672 | 5/1991 | Stephenson ........................ 137/625.24 |
| 5,065,793 | 11/1991 | Stephenson et al. .............. 137/625.24 |
| 5,115,640 | 5/1992 | Stephenson et al. ................ 91/467 X |
| 5,129,424 | 7/1992 | Stephenson et al. .............. 137/625.24 |
| 5,161,577 | 11/1992 | Stephenson ........................ 137/625.24 |
| 5,186,211 | 2/1993 | Stephenson et al. .............. 137/625.24 |

FOREIGN PATENT DOCUMENTS

| 0 773 156 A2 | 5/1997 | European Pat. Off. . |
| 3428727A1 | 2/1985 | Germany . |
| 3905636A1 | 10/1989 | Germany . |
| 63-145173 | 6/1988 | Japan . |
| 90/03295 | 4/1990 | WIPO . |

*Primary Examiner*—Gerald A. Michalsky
*Attorney, Agent, or Firm*—Evenson, McKeown, Edwards & Lenahan, P.L.L.C.

[57] ABSTRACT

This invention relates to a servo valve which is constructed in the manner of a slide valve and particularly in the manner of a rotary slide valve. For changing the control characteristics the width of control gaps can be changed which exists in a normal or starting position. For this purpose, it is preferably provided that the control edges of the control gaps are aligned at least partially diagonally to the direction of the control strokes and the sliding part as well as the counter sliding part are completely or partially adjustable relative to one another transversely with respect to the direction of the control strokes.

8 Claims, 5 Drawing Sheets

SERVO VALVE

BACKGROUND AND SUMMARY OF THE INVENTION

This invention relates to a servo valve of a sliding-valve type having sliding and countersliding parts which can be moved relative to one another, having a pressure connection and at least one low-pressure connection as well as a motor connection which can be connected with the pressure connection by way of a first gap between a control edge on the sliding part and an assigned control edge on the countersliding part and can be connected with the low-pressure connection by way of another gap between another control edge on the sliding part and an assigned additional control edge on the countersliding part, one gap respectively being expanded and the other gap being contracted during control strokes or control angles of the sliding part relative to the countersliding part.

Servo valves of this type are generally known and are used, for example, in power steering systems of motor vehicles for controlling the servo motor assigned to the power steering system. In this case, the servo motor is always constructed as a double-action piston-cylinder element which is controlled by way of a servo valve with two motor connections which are arranged on mutually parallel hydraulic paths between the high-pressure and low-pressure connection of the servo valve. The control gaps assigned to these motor connections change their cross-sections during control strokes of the servo valve in such a manner that, depending on the direction of the control stroke, a more or less large pressure difference occurs between the motor connections in one or the other direction and the servo motor can correspondingly generate a more or less high power in one or the other direction.

According to German Patent Document DE 34 28 727 A1, servo valves of power steering systems can be constructed as rotary slide valves with a sliding part which can be rotated within a rotary sliding bush. These parts are arranged within the drive connection between the hand steering wheel and the steered vehicle wheels in such a manner that they rotate more or less intensively relative to one another in one or the other direction as a function of the forces transmitted between the hand steering wheel and the steered vehicle wheels so that the servo motor can generate a servo force which is a function of the amount of the transmitted forces and by which the manual force noticeable and to be applied at the hand steering wheel is reduced.

In principle, it is desired and known to change the characteristics of a power steering system as a function of the parameters to be given. For example, it can be provided to let the power steering system operate at an increased speed with a rising sluggishness, that is, with an increased manual operating force. The servo valves which have been used in this context have a comparatively high-expenditure construction.

From German Patent Document DE 39 05 636 A1, slide valve is known which is constructed as a 3/2-valve and in which a valve bore is provided in a housing and valve connections are provided which branch off the housing in the transverse direction, in which case the connection which is in the center in the longitudinal direction of the valve bore communicates with a hydraulic assembly to be controlled, and the two other connections lead to a pressure source or to a relatively pressureless reservoir. A slide, which is arranged within the valve bore and is axially displaceable, makes it possible by means of a corresponding axial displacement, to block the center connection with respect to the two other connections or to connect it in each case with one of the two other connections, in which case, depending on the position of the slide, the connection has a more or less large throttle resistance. The mouth of the center connection into the valve bore may have a noncircular shape, for example, the shape of a square, whose diagonal line is aligned in parallel to the axis of the valve bore. When the slide is slid out of its position blocking the center connection, an opening to the center connection with a triangular cross-section is first opened up whose size increases when the slide is adjusted further.

It is an object of the invention to provide a new and advantageous possibility of a parameter-dependent change of the control characteristics of a servo valve.

According to the invention, this object is achieved in that the cross-section of at least one gap which exist in the normal position of the servo valve can be changed by the displacement of its control edges relative to one another in a transverse direction with respect to the direction of the control strokes.

The invention is based on the general idea of changing the geometry of the respective gap as a result of an additional movability of the control edges transversely to the direction of the normal control strokes. This has the result that, during a control stroke, the throttle resistance of the gap changes in a changed manner and a different functional relationship is achieved between the pressure levels occurring at the engine connections and the control stroke. This means therefore that the characteristic of the progression of the pressure at the motor connection or motor connections changes during control strokes.

According to a first embodiment of the invention, the sliding part and the countersliding part respectively can be displaced relative to one another transversely to the control stroke. In the case of a servo valve constructed according to the type of a rotary slide valve, this means that the rotary sliding bush and the rotary sliding part, which is rotated relative to the rotary slide bush during control strokes, can be axially displaced with respect to one another.

In a second embodiment, a control edge part which is movable transversely to the control stroke is arranged on the sliding or countersliding part.

Other objects, advantages and novel features of the present invention will become apparent from the following detailed description of the invention when considered in conjunction with the accompanying drawings.

DETAILED DESCRIPTION OF THE DRAWINGS

Figure 1:
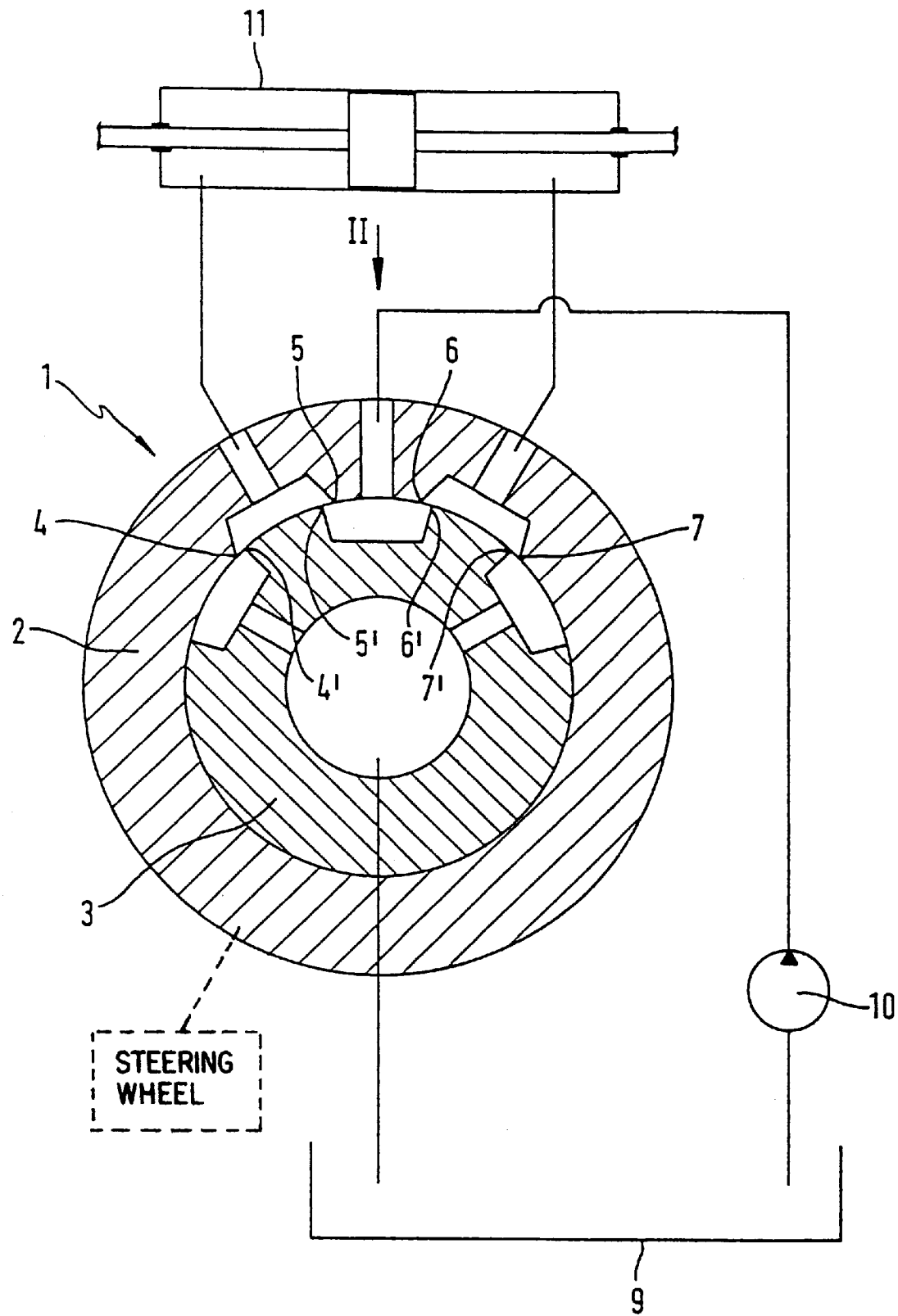
FIG. 1 is a radial sectional view of a servo valve constructed as a rotary slide valve schematically shown connected with a vehicle steering wheel in accordance with a first preferred embodiment of the present invention.

According to FIG. 1, the servo valve 1 constructed as a rotary slide valve has a sliding bush 2 as well as a rotary sliding part 3 which can be rotated therein and whose outside diameter is adapted to the inside diameter of the sliding bush 2.

In the interior circumferential wall of the sliding bush 2, at least two axial recesses are arranged which have control edges 4 to 7. On its outer circumference, the rotary sliding part 3 has at least three similar recesses with control edges 4' to 7'. In the illustrated center position of the sliding bush 2 and the rotary sliding part 3, more or less wide gaps remain in each case between the control edges 4 as well as 4', 5 as well as 5', etc. so that the chambers formed by the recesses of the sliding bush 2 as well as of the rotary sliding part 3 communicate with one another.

Optionally, the number of the axial recesses may also amount to a multiple of two or a multiple of three. The number must only be selected such that transverse force freedom exists when pressure medium is introduced.

The pressure pipe of a servo pump 10 connected on the suction side with a relatively pressureless reservoir 9 leads into the space between the control edges 5 and 6. A servo motor 11, which is constructed as a double-action piston-cylinder unit, is connected on its one side with the space between the control edges 4 and 5 and is connected on its other side with the space between the control edges 6 and 7. The spaces situated outside the control edges 4 and 7 communicate with the reservoir 9.

In the illustrated center position of the sliding bush 2 and the rotary sliding part 3 relative to one another, a pressure equilibrium exists between the two sides of the servo motor 7 because the control gaps between the edges 5 and 5' as well as 6 and 6', on the one hand, and the gaps between the control edges 4 and 4' as well as 7 and 7', on the other hand, each have the same cross-sections so that, from the delivery side of the servo pump 10, two flow paths exist which are throttled in the same manner—on the one hand, through the gaps between the control edges 5 as well as 5' and 4 as well as 4' and, on the other hand, by way of the gaps between the control edges 6 as well as 6' and 7 as well as 7'. In contrast, when the sliding bush 2 and the rotary sliding part 3 are rotated relative to one another, two flow paths are formed which are asymmetrical to one another. When, for example, the rotary sliding part 3 is rotated counterclockwise relative to the sliding bush 2, the slot between the control edges 5 and 5' will widen while the slot between the control edges 6 and 6' will narrow. At the same time, the slot between the control edges 4 and 4' will narrow, while the slot between the control edges 7 and 7' will widen. This has the result that the pressure on the left side of the servo motor 11 rises relative to the pressure on its right side; that is, the piston of the servo motor 11 attempts to slide toward the right.

The pressure difference between the two sides of the servo motor 11 depends on the extent as well as the direction of the rotary stroke between the sliding bush 2 and the rotary sliding part 3, in which case the progression between the change of the pressure difference and the respective rotary stroke depends on the cross-section as well as particularly on the width of the slots between the control edges 4 and 8' in the center position of the rotary sliding bush 2 and the rotary sliding part 3.

According to the invention, this progression can now be changed as follows.

Figure 2:
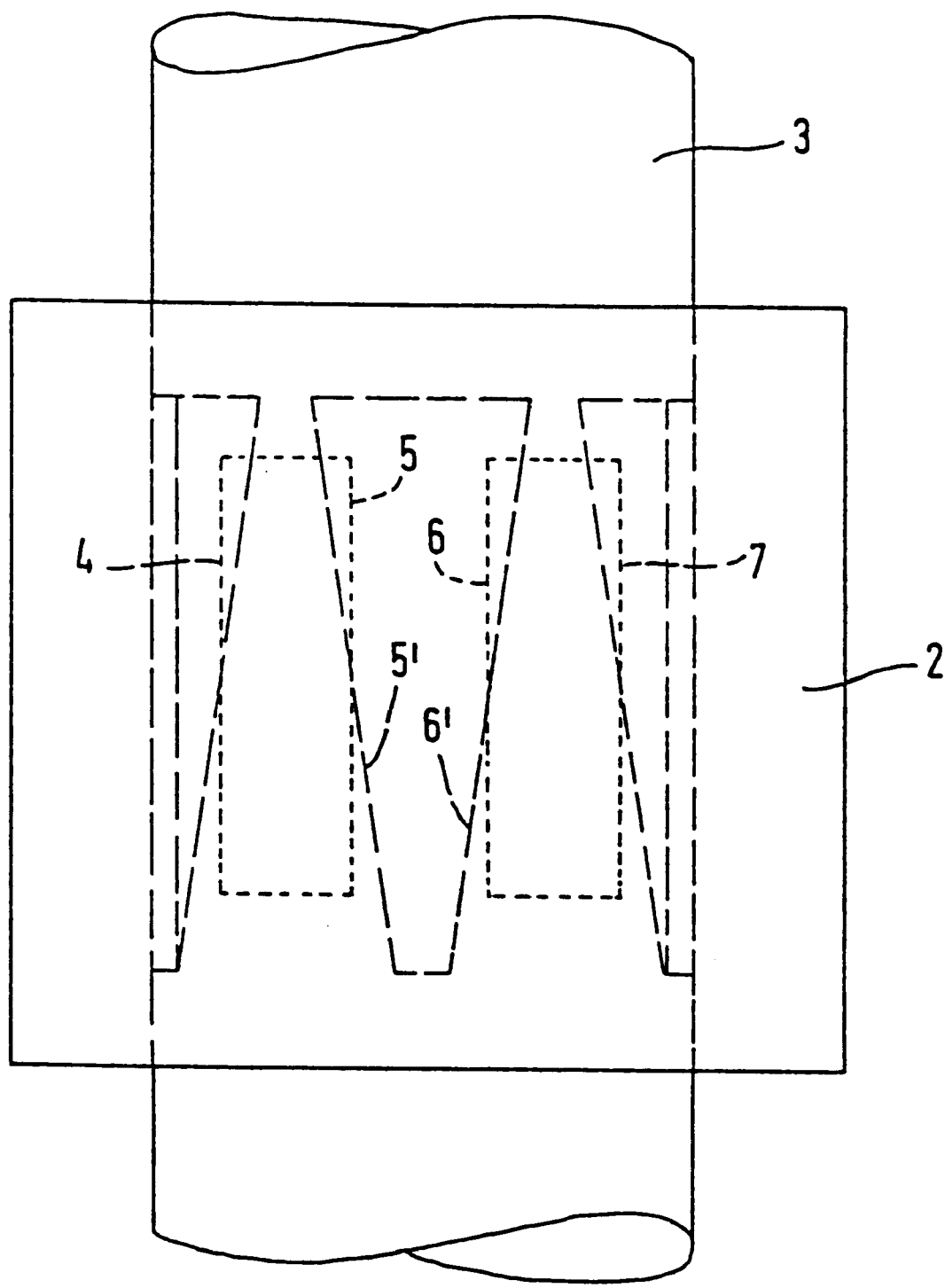
FIG. 2 is a lateral view of a cutout of the sliding bush and the rotary sliding part corresponding to the arrow II in FIG. 1.

According to FIG. 2, the control edges 5 and 6 of the sliding bush 2 are aligned in parallel to its longitudinal axis, whereas the control edges 5' and 6' of the rotary sliding part 3 are aligned diagonally to this longitudinal axis and V-shaped with respect to one another. As a result of the axial adjustability of the rotary sliding part 3 relative to the sliding bush 2, the center width of the control gaps between the edges 5 and 5' or 6 and 6' can therefore be enlarged or reduced. The same applies to the control gaps between the control edges 4 and 4' or 7 and 7'.

Deviating from the embodiment illustrated in FIG. 2, the control edges 5 and 6 of the rotary sliding bush 3 may optionally be arranged in the same manner as the control edges 5' and 6' of the rotary sliding part 3 in a V-shape. Also in this case, the control slots can then be narrowed and widened by the axial displacement of the rotary sliding bush 2 relative to the rotary sliding part 3.

Figure 3:
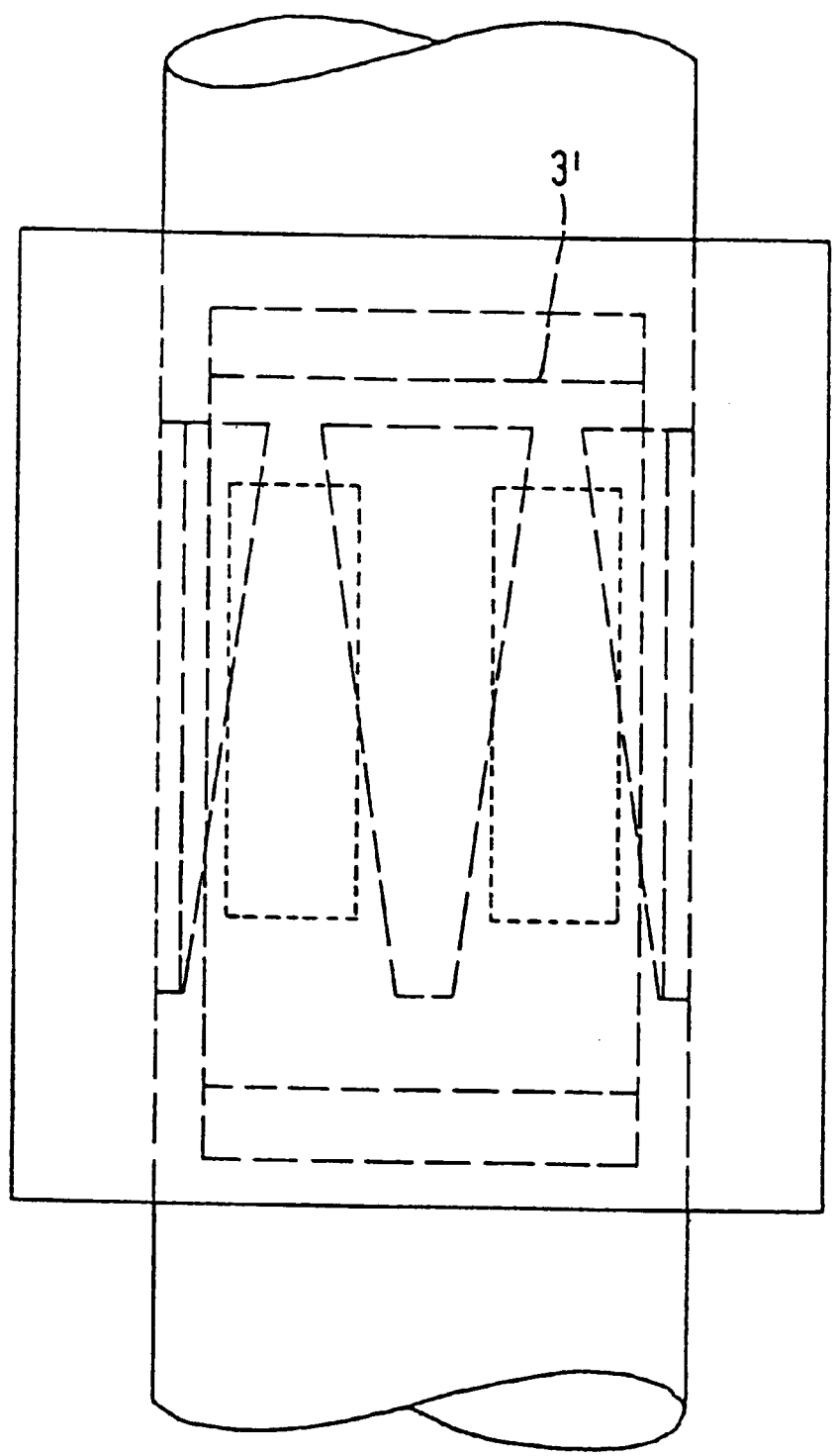
FIG. 3 is a view corresponding to FIG. 2 of a modified embodiment.

According to FIG. 3, the whole rotary sliding part 3 does not have to be axially displaceable relative to the sliding bush 2. On the contrary, it is also possible to provide axially displaceable sliding pieces 3' on the rotary sliding part 3 on which the control edges—in this case, 5' and 6'—are arranged.

In a manner which is the same in principle, movable sliding pieces may also be provided on the sliding bush 2.

Figure 4:
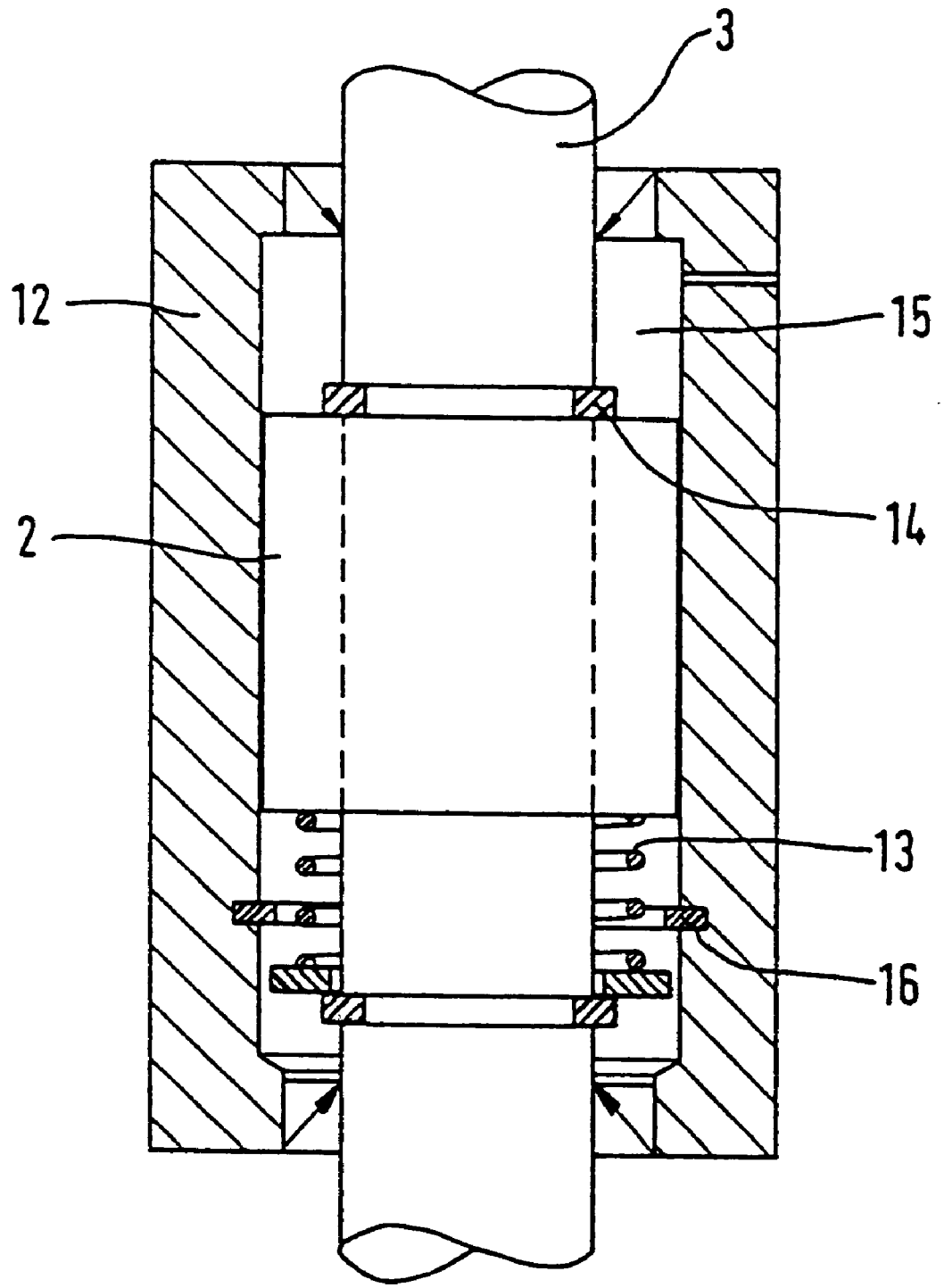
FIG. 4 is a schematic axial sectional view of the embodiment according to FIG. 3.

In the embodiment illustrated in FIG. 4, the sliding bush 2, which is axially movable on the rotary sliding part 3, is arranged inside a housing 12 in the manner of a ring piston which is pushed by means of a spring 13 against a first stop ring 14 and by means of controllable hydraulic pressure in a toroidal chamber 15 against the force of the above-mentioned spring 13 against a second stop ring 16. According to the amount of the hydraulic pressure in the toroidal chamber 15, the sliding bush 2 takes up an intermediate position between the stop rings 14 and 16.

Figure 5:
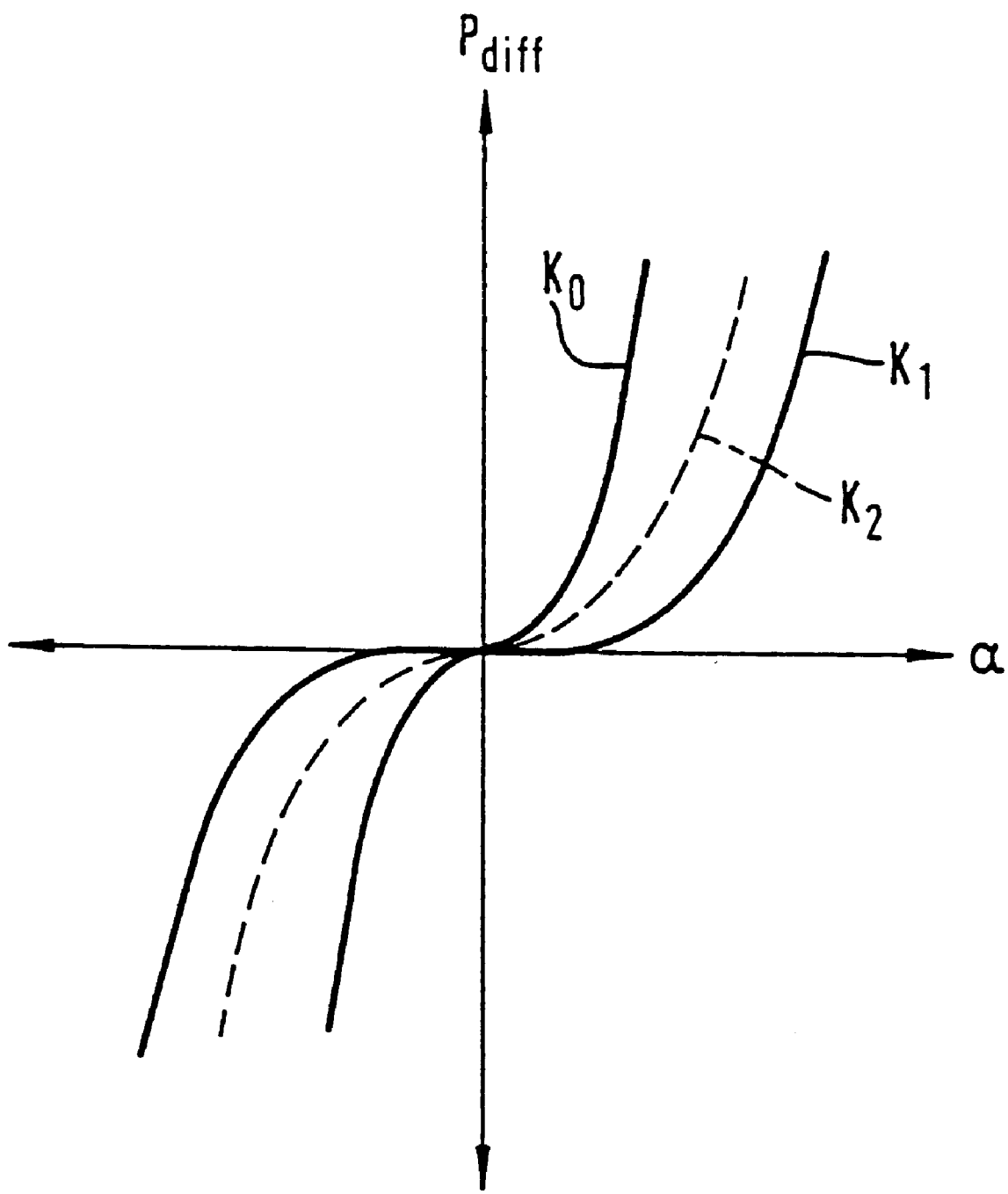
FIG. 5 is a representation of several diagrams which reflect the control action of preferred embodiments of the present invention.

FIG. 5 shows diagrams which illustrate the differential pressure $P_{diff}$ between the two sides of the servo motor 11 as a function of the relative angle of rotation $\alpha$ between the sliding bush and the rotary sliding part 3, specifically at different axial positions of the mutually interacting control edges. When the rotary sliding part 3 is rotated relative to the sliding bush 2 with respect to the center position toward one direction, a pressure difference is obtained in the one direction which rises with the increasing angle of rotation. In the case of the relative rotation in the other direction, a corresponding pressure difference occurs in the reverse direction. The curve $K_0$ shows the conditions which occur when the control gaps between the mutually interacting control edges are comparatively narrow in the center position of the sliding bush and the rotary sliding part 3. Curve $K_1$ shows the corresponding conditions when the mentioned control gaps have a large width. Curve $K_2$ shows the conditions in the case of wide control gaps.

If now, as in the case of previous power steering systems, the relative angle of rotation between the sliding bush 2 and the rotary sliding part 3 depends on the forces transmitted between the hand steering wheel and the steered vehicle wheels, in the case of curve $K_0$, the power assistance of the servo motor 11 starts comparatively early, whereas, in the case of curves $K_1$ and $K_2$, the servo assistance becomes effective very late and later. In this manner, the vehicle steering can be changed between an easy operation and a sluggish operation.

According to a particularly preferred embodiment, the sliding bush and/or the sliding parts which can be displaced transversely to the normal control or rotary stroke can be constructed as deep-drawn parts in order to permit a particularly simple manufacturing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Power steering assembly for a motor vehicle, comprising a servo valve configured as a rotary slide valve and having sliding and countersliding parts arranged to be relatively movable in two opposite rotary directions; a first pressure connection; a second low-pressure connection, and two motor connections operatively connected with the first pressure connection by way of first gaps between associated control edges on the sliding and the countersliding parts and operatively connected with the second low-pressure connection by way of second gaps between other control edges on the sliding and the countersliding parts, whereby rotary strokes of the sliding part relative to the countersliding part control a pressure difference between the motor connections, wherein the sliding and countersliding parts are additionally movable relative to one another in an axial direction, whereby the cross-section of at least one of the first and second gaps is varied, thereby simultaneously changing a progression between a pressure difference change and the rotary stroke of the sliding and the countersliding parts, said axial stroke being controlled in a set relation to a predetermined vehicle parameter.

2. Power steering assembly according to claim 1, wherein the control edges of at least one of the sliding part and the countersliding part are aligned diagonally to the direction of the control strokes.

3. Power steering assembly according to claim 2, wherein the rotary slide part is arranged in an axially displaceable manner relative to a rotary sliding bush of the servo valve.

4. Power steering assembly according to claim 2, wherein a sliding part which has at least one control edge and can be displaced transversely to the direction of the control strokes is arranged on one of a rotary sliding part and a rotary sliding bush of the servo valve.

5. Power steering assembly according to claim 1, wherein the rotary slide part is arranged in an axially displaceable manner relative to a rotary sliding bush of the servo valve.

6. Power steering assembly according to claim 1, wherein the associated control edges along the length of the first and second gaps define a shape whose area selectively increases or decreases upon at least one of axial and rotary movement of the sliding and countersliding parts.

7. Power steering assembly according to claim 1, wherein the control gaps are so configured that throttle resistances of the control gaps remain unchanged upon axial relative movement of the sliding and the countersliding parts.

8. Power steering assembly, for a motor vehicle, comprising a servo valve configured as a rotary slide valve and having sliding and countersliding parts arranged to be relatively movable in two opposite rotary directions; a first pressure connection; a second low-pressure connection, and two motor connections operatively connected with the first pressure connection by way of first gaps between associated control edges on the sliding and the countersliding parts and operatively connected with the second low-pressure connection by way of second gaps between other control edges on the sliding and the countersliding parts, whereby rotary strokes of the sliding part relative to the countersliding part control a pressure difference between the motor connections, wherein the sliding and countersliding parts are additionally movable relative to one another in an axial direction, whereby the cross-section of at least one of the first and second gaps is varied, thereby simultaneously changing a progression between a pressure difference change and the rotary stroke of the sliding and the countersliding parts, said axial stroke being controlled in a set relation to a predetermined vehicle parameter, wherein the associated control edges along the length of the first and second gaps define a shape whose area selectively increases or decreases upon at least one of axial and rotary movement of the sliding and countersliding parts, and wherein the shape is triangular.

* * * * *